(12) United States Patent
Roper

(10) Patent No.: US 9,160,072 B2
(45) Date of Patent: Oct. 13, 2015

(54) ANTENNA SYSTEM HAVING GUARD ARRAY AND ASSOCIATED TECHNIQUES

(71) Applicant: Raytheon Company, Waltham, MA (US)

(72) Inventor: Joel C. Roper, Plano, TX (US)

(73) Assignee: Raytheon Company, Waltham, MA (US)

( * ) Notice: Subject to any disclaimer, the term of this patent is extended or adjusted under 35 U.S.C. 154(b) by 493 days.

(21) Appl. No.: 13/676,646

(22) Filed: Nov. 14, 2012

(65) Prior Publication Data
US 2014/0132449 A1    May 15, 2014

(51) Int. Cl.
| | | |
|---|---|---|
| *H01Q 3/26* | (2006.01) | |
| *H01Q 25/00* | (2006.01) | |
| *G01S 13/72* | (2006.01) | |
| *G01S 13/00* | (2006.01) | |

(52) U.S. Cl.
CPC .............. *H01Q 3/26* (2013.01); *G01S 13/726* (2013.01); *H01Q 3/2617* (2013.01); *H01Q 3/2635* (2013.01); *H01Q 25/00* (2013.01); *G01S 13/003* (2013.01)

(58) Field of Classification Search
USPC ........... 342/368, 372, 373, 379; 343/751, 835
See application file for complete search history.

(56) References Cited

U.S. PATENT DOCUMENTS

| | | | |
|---|---|---|---|
| 4,672,378 A | 6/1987 | Drabowitch et al. | |
| 5,047,785 A | 9/1991 | Julian | |
| 5,652,591 A | 7/1997 | Liu et al. | |
| 7,786,948 B2 | 8/2010 | Webb et al. | |

FOREIGN PATENT DOCUMENTS

| | | |
|---|---|---|
| EP | 0 098 339 A1 | 1/1984 |
| GB | 2 303 266 A | 2/1997 |

OTHER PUBLICATIONS

Search Report of the ISA for PCT/US2013/059593 dated Dec. 12, 2013.
Written Opinion of the ISA for PCT/US2013/059593 dated Dec. 12, 2013.
PCT International Preliminary Report on Patentability of the ISA for PCT/US2013/059593 dated May 28, 2015.

*Primary Examiner* — Dao Phan
(74) *Attorney, Agent, or Firm* — Daly, Crowley, Mofford & Durkee, LLP

(57) ABSTRACT

An antenna system includes a main array and a guard array. The main array has an antenna pattern that includes a main beam and multiple side lobes that are concentrated in distinct side lobe regions. The guard array includes an antenna pattern that encompasses both the main beam and the side lobe regions of the main array. In addition, an outer boundary of the antenna pattern of the guard array roughly tracks an outer boundary of the distinct side lobe regions of the main array. In at least one embodiment, the main array is a rectangular or quasi-rectangular array having side lobes concentrated within two orthogonal ridges and the guard array comprises one of a cross-guard array, an L-guard array, and a T-guard array.

26 Claims, 14 Drawing Sheets

ANTENNA SYSTEM HAVING GUARD ARRAY AND ASSOCIATED TECHNIQUES

BACKGROUND

Array antennas are antennas that include a number of radiating elements arranged in a predefined pattern that act collectively to generate an antenna pattern. Some array antennas, known as phased arrays, have beams that may be controllably steered by varying phase values associated with the elements of the array. An antenna pattern of an array antenna may have a main beam and one or more side beams or side lobes. Often, the side lobes are considered undesirable. In many receiver-based applications, only signals received through the main beam of an array antenna are of interest. For example, in a radar system that derives information about a remote target from one or more return pulses received from the target, the receiver may only be interested in processing pulses received through the main beam of the receive antenna. Likewise, in some communication systems, a receiver may only be interested in signals received from a particular direction and may wish to reject signals received from other directions.

A guard antenna is an antenna that works in conjunction with an array antenna to determine whether signals received through the array antenna were received through a main beam of the antenna or through a side lobe of the antenna. Techniques and structures are needed for implementing guard array antennas that are effective and easy to use.

SUMMARY

Novel guard array antenna architectures and techniques are described herein. The guard array architectures are for use with array antennas having antenna patterns with well defined side lobe regions. The guard array architectures have directional antenna patterns that cover and roughly follow the shape of the distinct side lobe regions of the main array. That is, an outer boundary of the antenna pattern of the guard array may roughly track an outer boundary of the side lobe regions of the main array, while still fully encompassing the side lobe regions. In this manner, higher gains may be achieved by the guard array in the direction of the side lobes of the main array, which enhances the guard antenna's ability to perform its function.

In some embodiments, guard array antennas are provided for use with rectangular or quasi-rectangular main arrays. As is known, the side lobes of rectangular or quasi-rectangular main arrays are typically concentrated within two well defined orthogonal ridges. Guard array structures are provided that have antenna patterns with a similar shape to these well defined ridge regions, while still encompassing these regions. For example, in various embodiments, a cross-guard array having radiating elements arranged in a cross shape, an L-guard array having radiating elements arranged in a L shape, and a T-guard array having radiating elements arranged in a T shape are used with a rectangular or quasi-rectangular main array.

In accordance with one aspect of the concepts, systems, circuits, and techniques described herein, an antenna system comprises: a main array antenna including a first plurality of antenna elements defining a first aperture, the main array antenna having a first antenna pattern that includes a main beam and side lobes, the side lobes being primarily concentrated within one or more distinct side lobe regions; and a guard array antenna including a second plurality of antenna elements defining a second aperture, the guard array antenna having a second antenna pattern with a shape that encompasses the one or more distinct side lobe regions of the first antenna pattern and roughly follows a shape of the one or more distinct side lobe regions of the first antenna pattern.

In accordance with another aspect of the concepts, systems, circuits, and techniques described herein, a machine implemented method for operating an antenna system comprises: receiving a first signal through a main array antenna of the antenna system, the main array antenna having a first antenna pattern that includes a main beam and side lobes, wherein most of the side lobes reside in distinct side lobe regions; receiving a second signal through a guard array antenna of the antenna system, the guard array antenna having a second antenna pattern that covers both the main beam and the distinct side lobe regions of the first antenna pattern, the second antenna pattern having a shape that roughly follows a shape of the one or more distinct side lobe regions of the first antenna pattern; and comparing the first and second signals to determine whether one or more signal components received through the main array antenna were received through a side lobe.

In accordance with still another aspect of the concepts, systems, circuits, and techniques described herein, an antenna system comprises: a main array antenna having radiating elements arranged in a rectangular or quasi rectangular shape; and a guard array antenna having a first group of radiating elements aligned in first direction and a second group of radiating elements aligned in a second direction that is substantially orthogonal to the first direction, the first and second groups of radiating elements having at least one common element.

BRIEF DESCRIPTION OF THE DRAWINGS

The foregoing features may be more fully understood from the following description of the drawings in which.

DETAILED DESCRIPTION

Figure 1:
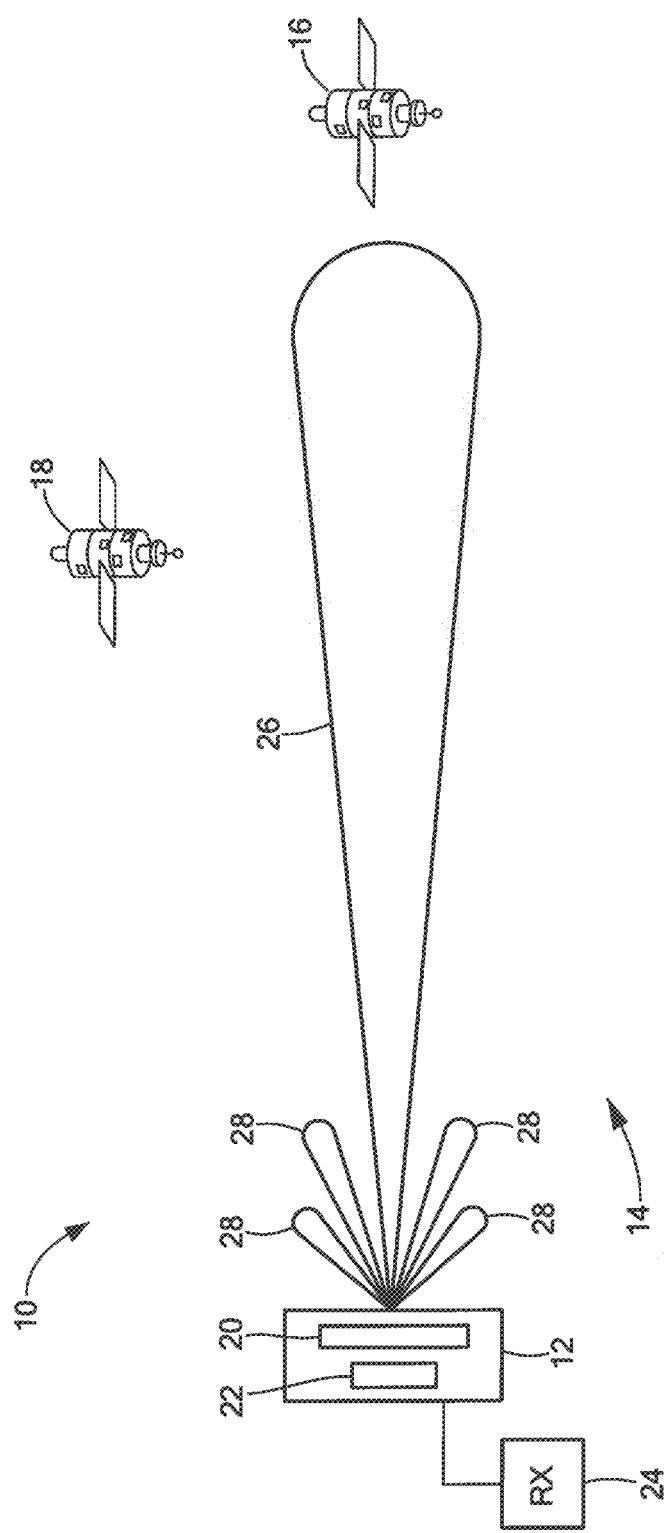
FIG. 1 is a diagram illustrating an exemplary radar system using an antenna system in accordance with an embodiment.

FIG. 1 is diagram illustrating an exemplary radar system 10 having an antenna system 12 in accordance with an embodiment. Radar system 10 may be used to, for example, search for and/or track one or more targets 16, 18 within a coverage region of interest. During radar operation, electromagnetic energy may be transmitted in a direction of a possible target in the region of interest. Return energy reflected from a target (if any) may then be received at antenna system 12. Radar receiver 24 may monitor and process energy received by antenna system 12 to, for example, detect the presence of targets. If one or more targets are detected, radar receiver 24 may further process the received energy to estimate information about the detected target(s) (e.g., range, velocity, angle, radar cross section, etc.). The radar transmit signal may be transmitted from antenna system 12, from another antenna on the same platform as antenna system 12, or from another location (e.g., a separate transmission station or transmitting platform).

As shown in FIG. 1, antenna system 12 may include a main array antenna 20 and a guard array antenna 22. As is well known, an array antenna is an antenna that includes multiple antenna elements (or radiating elements) that are arranged in a specific pattern and that operate collectively to generate a single antenna pattern. As illustrated in FIG. 1, main array antenna 20 may have an antenna pattern 14 having a main antenna beam 26 and one or more side lobes 28. During radar operation, receiver 24 may need to process return signals received through main beam 26 of antenna pattern 14, but not signals received through side lobes 28. As will be described in greater detail, guard array antenna 22 may be used to determine which signals received by main array antenna 20 were received through main beam 26 and which signals were received through side lobes 28. The signals received through side lobes 28 may then be rejected or otherwise compensated for.

The antenna pattern of guard array 22 (not shown in FIG. 1) covers both the side lobes 28 and the main beam 26 of main array 20. The antenna gain of guard array 22 in the direction of side lobes 28 is desirably greater than the gain of main array 20 and the gain of guard array 22. in the direction of main beam 26 is desirably less than the gain of main array 20. A return signal from a target may be received by both main array 20 and guard array 22. A return signal received through main beam 26 of main array 20 will have a much larger amplitude at an output of main array 20 than the same signal will have at the output of guard array 22. Conversely, a return signal received through a side lobe 28 of main array 20 will have a smaller amplitude at an output of main array 20 than the same signal will have at the output of guard array 22. By comparing the output of main array 52 to the output of guard array 54, therefore, receiver system 24 can determine whether a signal was received through the main beam 26 or the side lobes 28 of main array 20.

Figure 2:
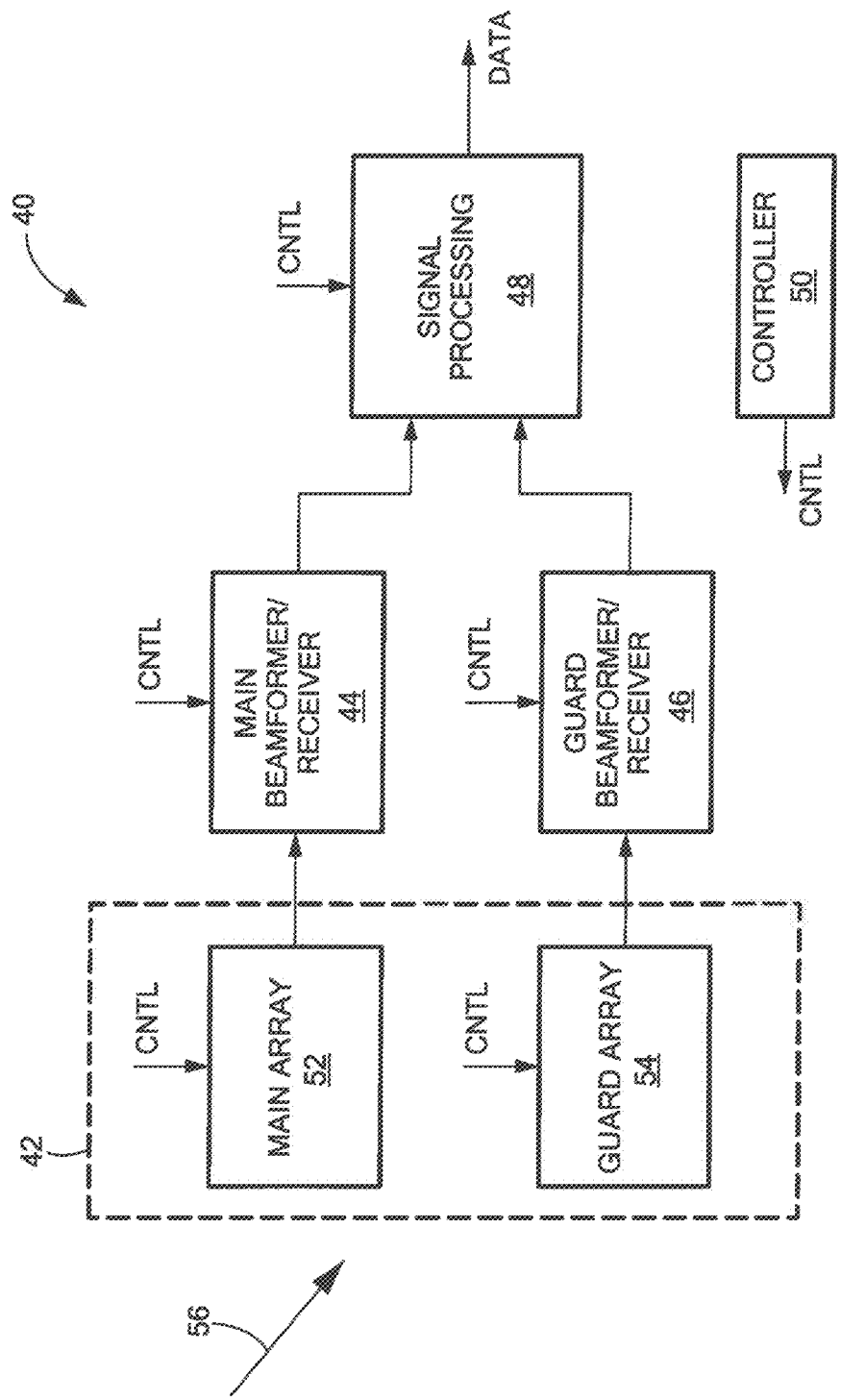
FIG. 2 is a block diagram illustrating a receiver system using an antenna system in accordance with an embodiment.

FIG. 2 is a block diagram illustrating a receiver system 40 having an antenna system 42 in accordance with an embodiment. The receiver system 40 may be used within, for example, radar system 10 of FIG. 1 or in other radar or communications systems. Antenna system 42 includes a main array 52 and a guard array 54 that have overlapping apertures. As illustrated, receiver system 40 may include a main beamformer/receiver subsystem 44, a guard beamformer/receiver subsystem 46, and a signal processing unit 48. A controller 50 may also be provided to control operation of one or more of the other elements of system 40. Main beamformer/receiver subsystem 44 may provide both the beamforming functionality and the radio frequency (RF) receive functionality for main array 52. The beamforming functionality is responsible for establishing the signal magnitudes and phases at the individual antenna elements of main array 52 to generate a desired beam. The RF receiver functionality is responsible for detecting and processing received RF energy and down converting the energy to a baseband representation for farther processing in signal processing unit 48. The beamforming and RF receiver functions may be performed separately (i.e., one after the other) or a mixed arrangement may be used. Digital and/or analog beamforming and digital and/or analog RF receive functionality may be used in various implementations. In a similar fashion to subsystem 44 described above, guard beamformer/receiver subsystem 46 may provide the beamforming functionality and the radio frequency (RF) receive functionality for guard array 54.

During a receive operation, an RF signal may be received by both main array 52 and guard array 54. Main beamformer/receiver subsystem 44 will process the resulting signal output by main array 52 to generate a first baseband receive signal at an input of signal processing unit 48. Likewise, guard beamformer/receiver subsystem 46 will process the resulting signal output by main array 52 to generate a second baseband receive signal at an input of signal processing unit 48. Signal processing unit 48 may then process the first and second baseband signals to estimate data about a detected target, if any. Signal processing unit 48 may compare the output of guard array 54 to the output of main array 52 to determine whether some or all of the output signal of main array 52 was received through an antenna side lobe. If it is determined that the some or all of the signal was received through a side lobe, that portion of the received signal may be subtracted out or otherwise suppressed before further processing is performed. Signal processing unit 48 may eventually output data corresponding to signals received through main beam 26 (e.g., target data for radar applications, user data for communications applications, etc.). Among other things, controller 50 may provide for synchronization and timing between the various components of system 40.

In many conventional guard antenna arrangements, guard antennas having a very broad antenna pattern have often been used. For example, in some systems, a single omnidirectional antenna element has been used as a guard antenna. However, the use of guard antennas having broad antenna patterns often makes it difficult or impossible to achieve the gain required in the directions of the side lobes of the main antenna to allow signals received through side lobes to be easily identified. As described previously, if the gain of the guard antenna in the side lobes regions of the main antenna is lower than the gain of the main antenna. in these regions, the magnitude of the output signal of the guard antenna may be lower than the magnitude of the output signal of the main antenna even when a signal is received through a side lobe. When this situation occurs, further processing is typically required to reject signals received through side lobes, which adds to the cost and complexity of the corresponding system.

As will be described in greater detail, guard array antennas and associated techniques are provided herein that are capable of achieving higher gain than a corresponding main array antenna in the direction of the side lobes of the main array. That is, guard arrays are provided that have antenna patterns that closely match the side lobe regions of corresponding main arrays, without covering large areas outside of the side lobe regions. It was appreciated that certain antenna array configurations have very distinct side lobe regions within which almost all of the side lobes of the main array are concentrated. Thus, in accordance with one aspect described herein, a guard array is provided, that covers the distinct side lobe regions of a corresponding main array, while leaving large areas outside the side lobe regions uncovered. Because of the directional nature of the guard array pattern, higher gains can be achieved in these regions.

In at least one embodiment, the radiating elements of main array 52 and the radiating elements of guard array 54 are implemented within a common two dimensional plane. In other embodiments, the radiating elements of main array 52 and guard array 54 are implemented in two separate planes. In still other embodiments, one or both of main array 52 and paid, array 54 may be curved or conformal arrays. Any type of radiating elements may he used including, for example, dipoles, monopoles, patches, slots, horns, helixes, and/or others. Main array 52 and guard array 54 may use the same type of elements or different types.

In some implementations, a guard antenna is provided for use with a rectangular or approximately rectangular main array. As is well known, a rectangular or quasi-rectangular antenna array can have a very distinct side lobe pattern organized in two substantially orthogonal ridges. As will be described in greater detail, a guard antenna may he used with a rectangular or quasi-rectangular main array that covers the two substantially orthogonal ridges of the main array without extending. That is the far field pattern of the guard array roughly matches the outline of the main antenna pattern without extending very far outside the pattern. As will be shown, various different array configurations may be used to achieve this result. These array configurations may include, for example, a cross guard array, an L guard array, and a T guard array.

Figure 3:
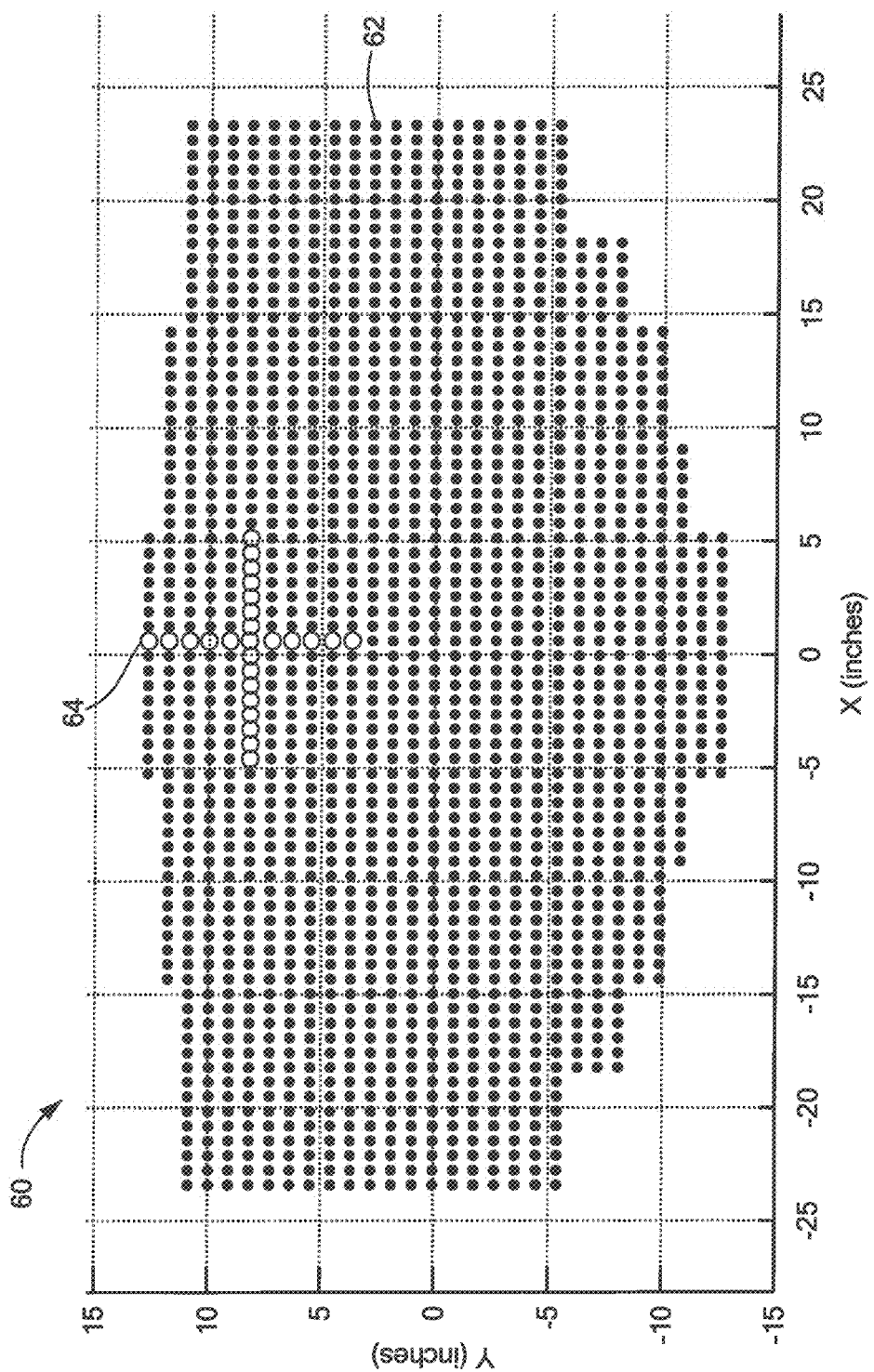
FIG. 3 is a schematic diagram illustrating an exemplary antenna system including a cross guard array in accordance with an embodiment.

FIG. 3 is a schematic diagram illustrating an exemplary antenna system 60 including a cross guard array in accordance with as embodiment. As illustrated, antenna system 60 includes a rectangular (or quasi-rectangular) main array 62 having a cross-guard array 64 embedded therein. That is, the elements of cross-guard array 64 are located at points within main array 62 that might normally be used for elements of the main array (i.e., same element spacing and alignment as the elements of the main array). As shown, cross-guard array 64 may comprise one or more adjacent rows of elements that intersect one or more adjacent columns of elements, at intermediate points therein, to form a cross shape. As will be described in greater detail, the antenna pattern formed by the cross-guard array 64 will roughly conform to and cover the distinct side lobe regions (i.e., the orthogonal ridges) of main array 62. In the illustrated embodiment, a single row of elements and a single column of elements form the cross guard array 64 and the single row and the single column intersect at a midpoint of each. In addition, the single row of elements and the single column of elements each have the same number of elements in the illustrated embodiments. In other implementations, the rows and columns of the cross guard array 64 may have different numbers of elements and/or may intersect at noncentral locations.

Cross-guard array 6 may be located anywhere within main array 62. In some embodiments, the elements of the main array 62 may be amplitude weighted for purposes of, for example, reducing side lobe levels. Typical weighting schemes may weight more centrally located elements with higher weights than elements closer to the edge of the main array. In these embodiments, it may be desirable to locate cross-guard array 64 closer to the edge in an area of lower amplitude weighting (although a central location for cross guard array 64 could still be used). In the illustrated embodiment cross guard array 64 is located along a top edge of main array 62, within a central location.

Figure 4:
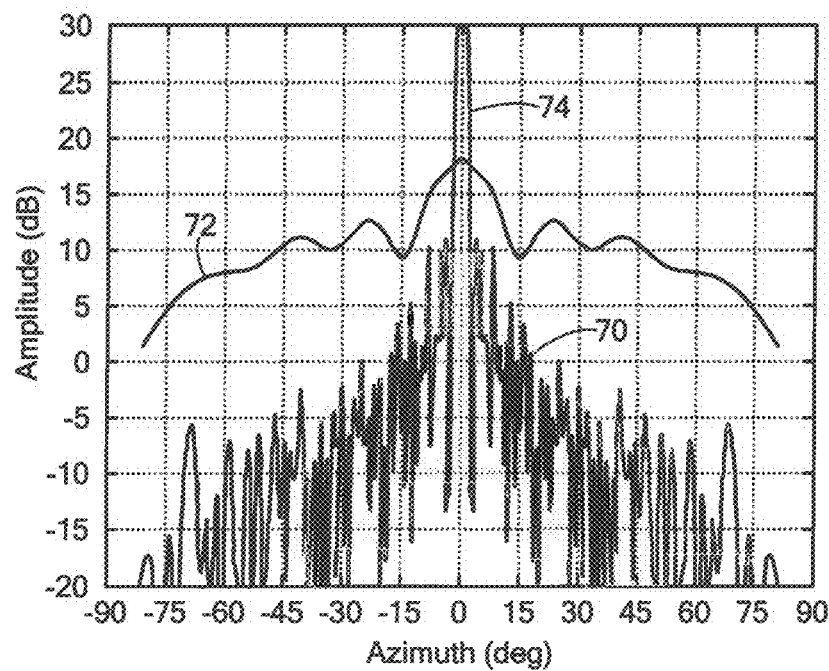
FIGS. 4 and 5 are amplitude versus angle plots illustrating antenna patterns associated with an antenna system having a cross-guard array in accordance with an embodiment.
Figure 5:
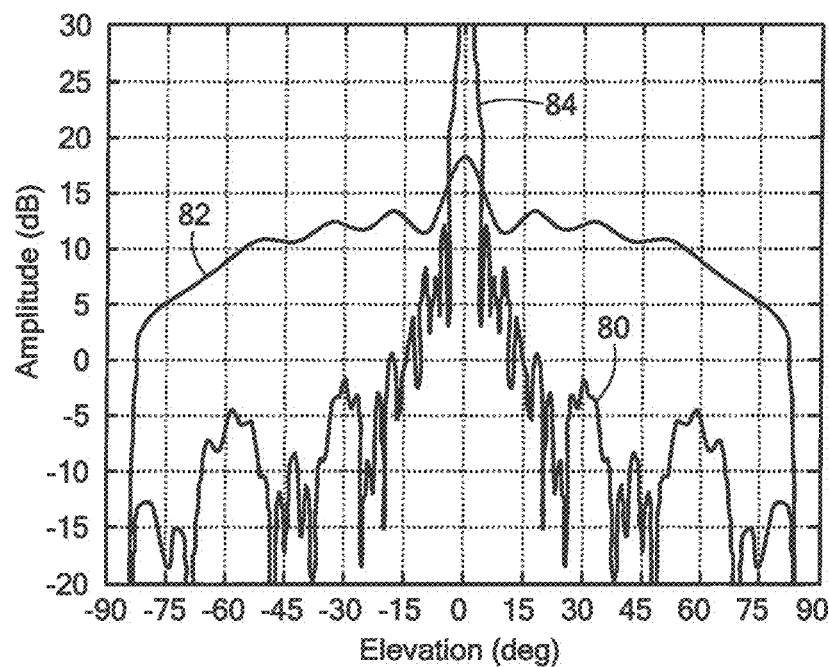

FIGS. 4 and 5 are amplitude versus angle plots illustrating antenna patterns for an antenna system having a cross-guard array in accordance with an embodiment. FIG. 4 illustrates an antenna pattern 70 for a main array and an antenna pattern 72 for a corresponding cross-guard array in an azimuth plane. Similarly, FIG. 5 illustrates an antenna pattern 70 for a main array and an antenna pattern 82 for a corresponding cross guard array in an elevation plane. As shown, in each direction, the gain of the pattern 72, 82 of the cross-guard array is greater than the gain of the main array pattern 70, 80 in the side lobe regions. Also, the gain of the pattern 72, 82 of the cross-guard array is smaller than the gain of the main array pattern 70, 80 in the direction of the main beam 74, 84 (e.g., azimuth angle=0 and elevation angle=0). In some implementations, nulls may exist in the pattern 72, 82 of the cross-guard array in the azimuth and/or the elevation. planes. These nulls could, in sonic instances, drop the gain of the cross guard array below the gain of the main array pattern in some directions. In some embodiments, phase spoiling techniques may be used in one or both dimensions to reduce or eliminate nulls in the cross guard pattern.

Figure 6:
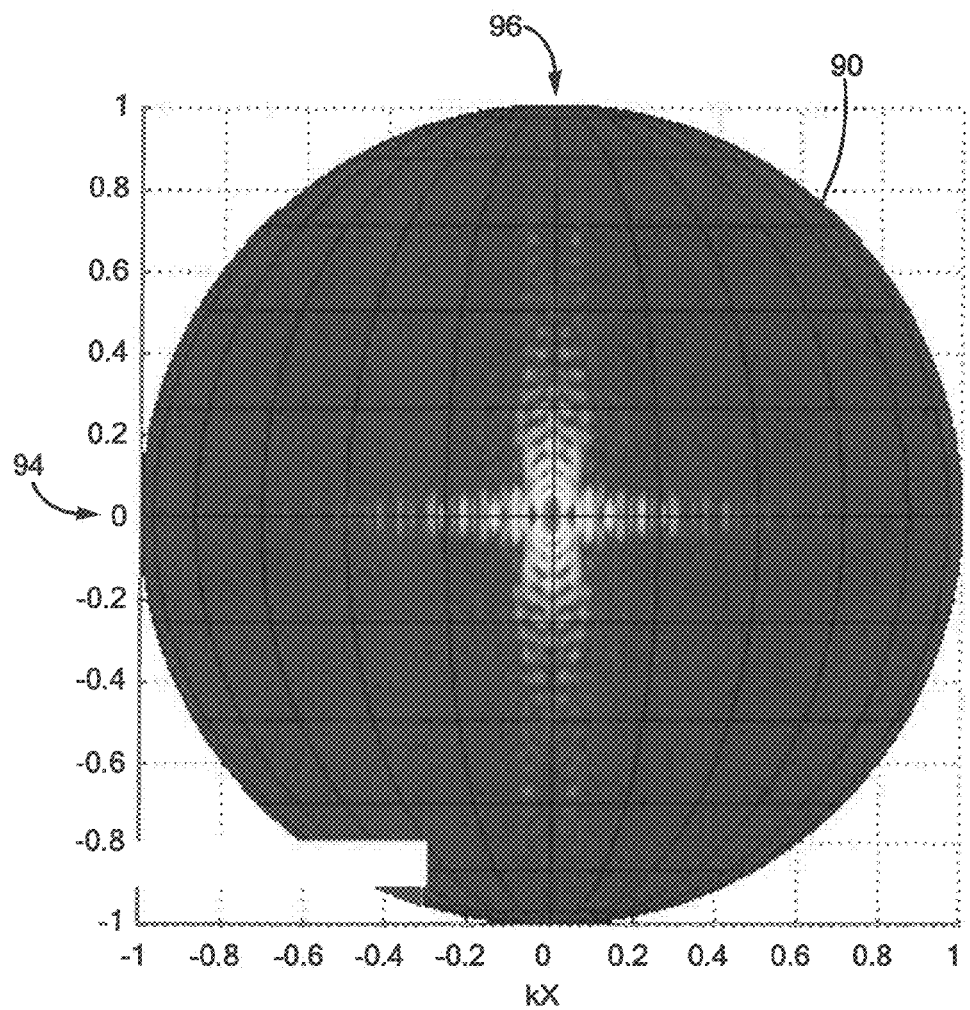
FIGS. 6, 7, and 8 are hemisphere plots illustrating antenna patterns for an antenna system having a cross-guard array in accordance with an embodiment.
Figure 7:
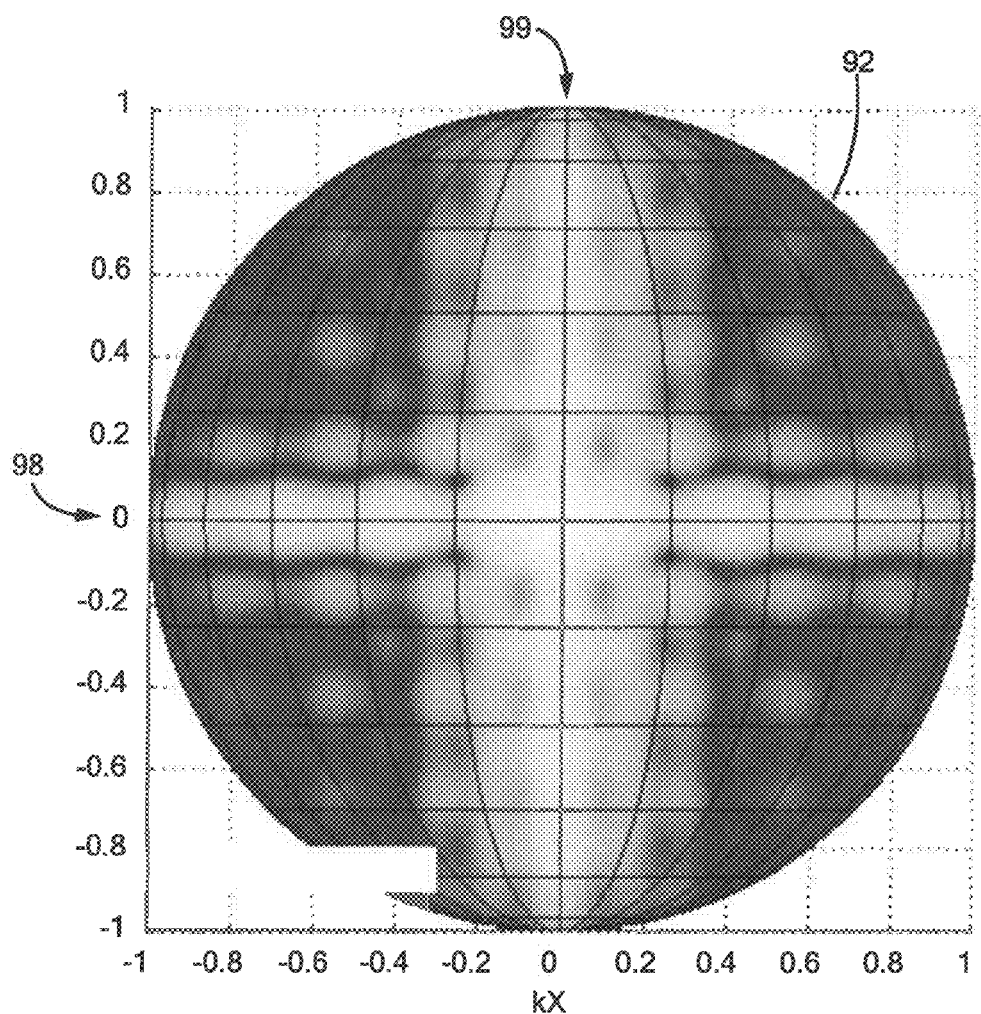
Figure 8:
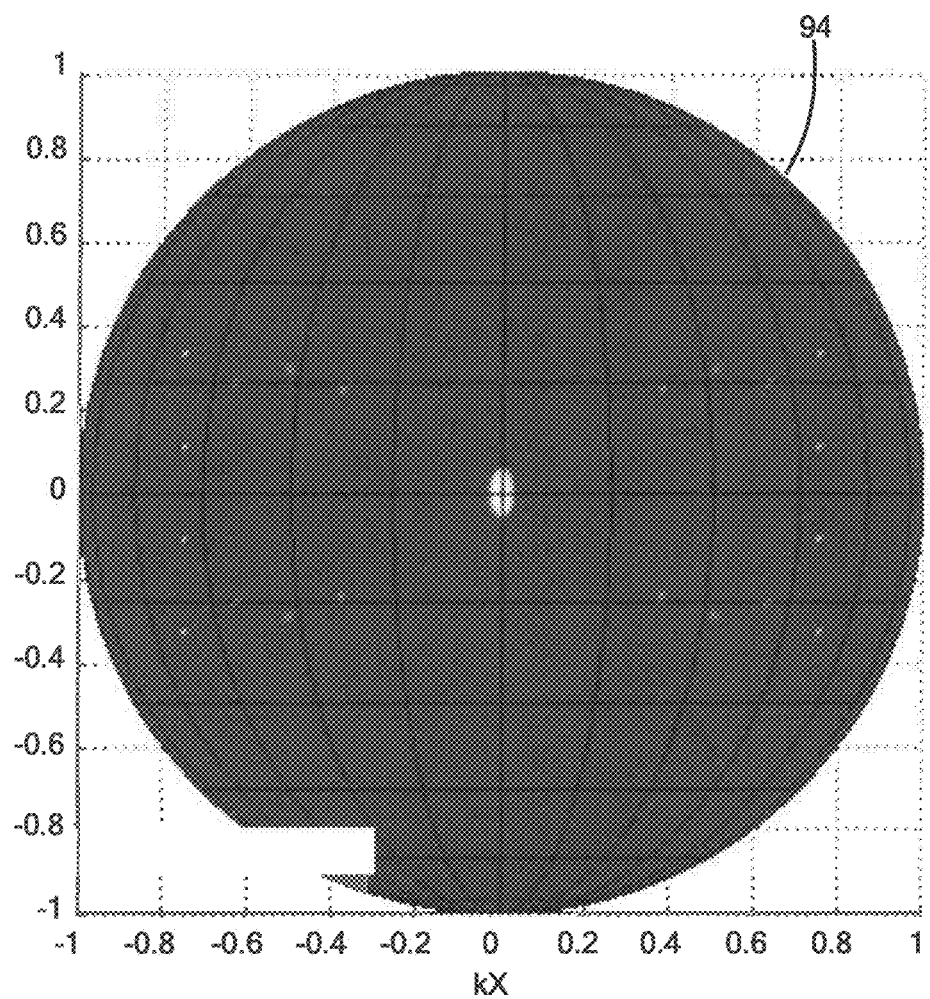

FIGS. 6, 7, and 8 are hemisphere plots illustrating antenna patterns for an antenna system having a cross-guard array in accordance with an embodiment. The antenna patterns are illustrated using relative magnitudes at various locations in a coverage region. FIG. 6 illustrates an antenna pattern 90 for a main array of the antenna system that is rectangular or quasi-rectangular in shape. As shown, antenna pattern 90 includes a high magnitude portion at a center thereof, corresponding to the main beam of the main array. In addition, the side lobes of the main array are concentrated within two orthogonal ridges 94, 96, FIG. 7 illustrates an antenna pattern 92 for a cross-guard array of the antenna system that is associated with the main array. As shown, the pattern 92 roughly follows the outline of the side lobe regions of the main array, while also covering the main beam position. That is, pattern 92 includes a strip 98 that encompasses and fellows the shape of side lobe ridge 94 of pattern 90 and a strip 99 that encompasses and follows the shape of side lobe ridge 96 of pattern 90, in addition, the pattern 92 has a higher magnitude in the side lobe regions than the pattern 90 of the main array, but has a significantly lower magnitude in the main beam position.

FIG. 8 illustrates an antenna pattern 94 of the full antenna system including both the main array and the cross-paid array. As shown, only the main beam at the center of the pattern and a few punch through points remain after the cross-guard array processing has been performed. In addition, because the guard array pattern has a higher magnitude in the sidelobe regions than the man array pattern, no farther processing was required to achieve this result. (i.e., other than the processing to reduce or subtract out the side lobe receptions identified by the cross-guard array.

Figure 9:
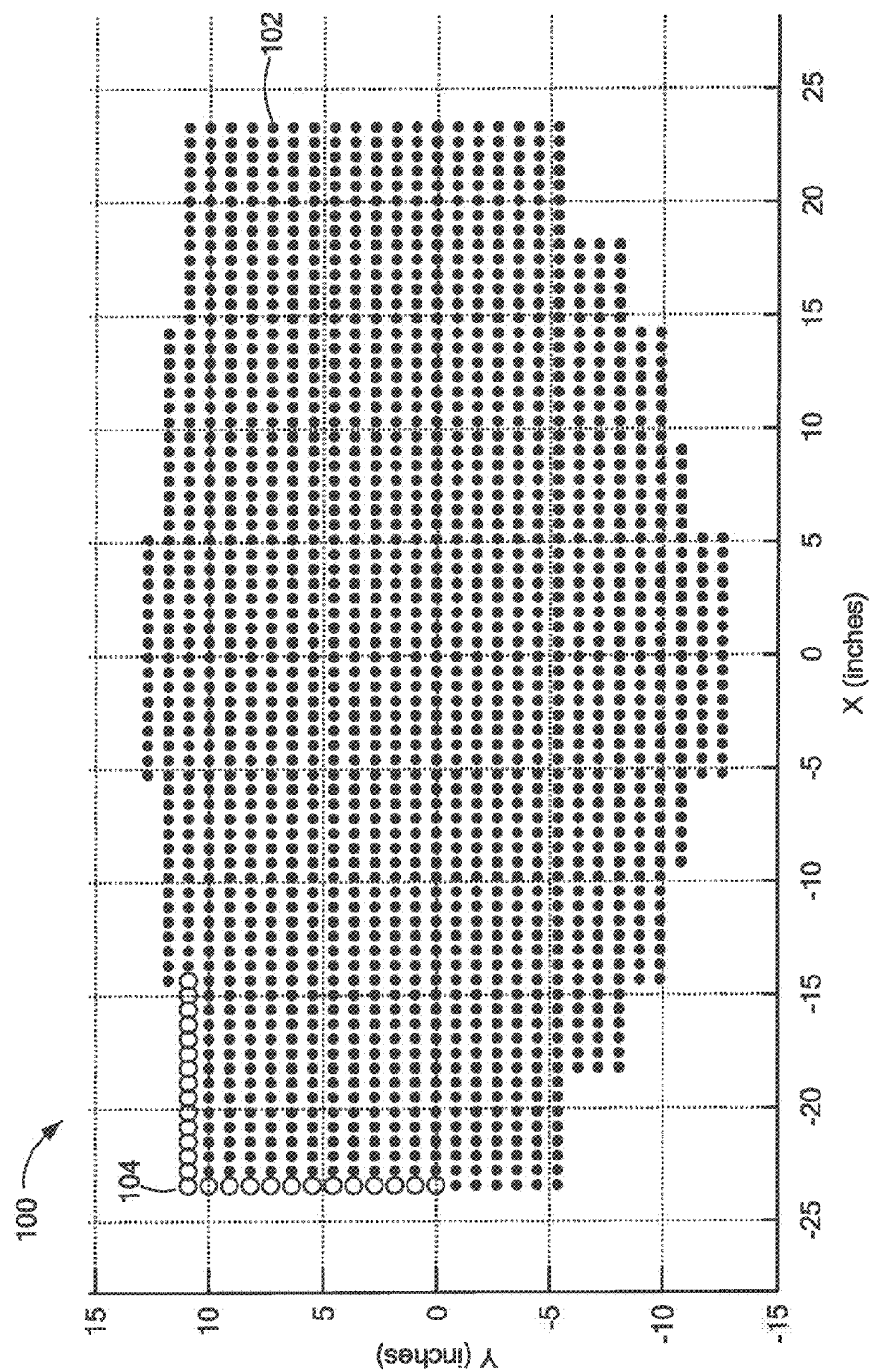
FIG. 9 is a schematic diagram illustrating an exemplary antenna system including an L-guard array in accordance with an embodiment.

FIG. 9 is a schematic diagram illustrating an exemplary antenna system 100 including an L-guard array in accordance with an embodiment. As illustrated, antenna system 100 includes a rectangular (or quasi-rectangular) main array 102 having an L-guard array 104 embedded therein. As shown, L-guard array 104 may comprise one or more adjacent rows of elements that adjoin to one or more adjacent columns of elements, at endpoints thereof, to form an L shape. As will be described in greater detail, the antenna pattern formed by L-guard array 104 will roughly conform to and cover the distinct side lobe regions (i.e., the orthogonal ridges) of main array 102. However, because of the reduced symmetry of the L-guard array, some additional punch through may result from use of the L guard array as opposed to the cross-guard array discussed previously. In the illustrated embodiment, a single row of elements and a single column of elements form the L-guard array 104. In addition, the single row of elements and the single column of elements each have the same number of elements in the illustrated embodiment. In other implementations, the row(s) and column(s) of L-guard array 104 may have different numbers of elements.

L-guard army 104 may be located in any of a number of different locations within main array 102. When amplitude weighting is being used, it may be preferable to place L-guard array 104 within a low magnitude regions of main array 102. In one approach, as shown in FIG. 9, L-guard array 104 may be placed in or near a corner of main array 102. In the corner, L-guard array 104 may have a minimal impact on the operation of main may 102 (especially in embodiments where the corners of the main array are heavily tapered). The corner of the array may also make it easier to gain access to these elements in the feed for use in the guard array, particularly in slotted array implementations. The L-guard array therefore has certain packaging advantages over the cross-guard array discussed previously.

Figure 10:
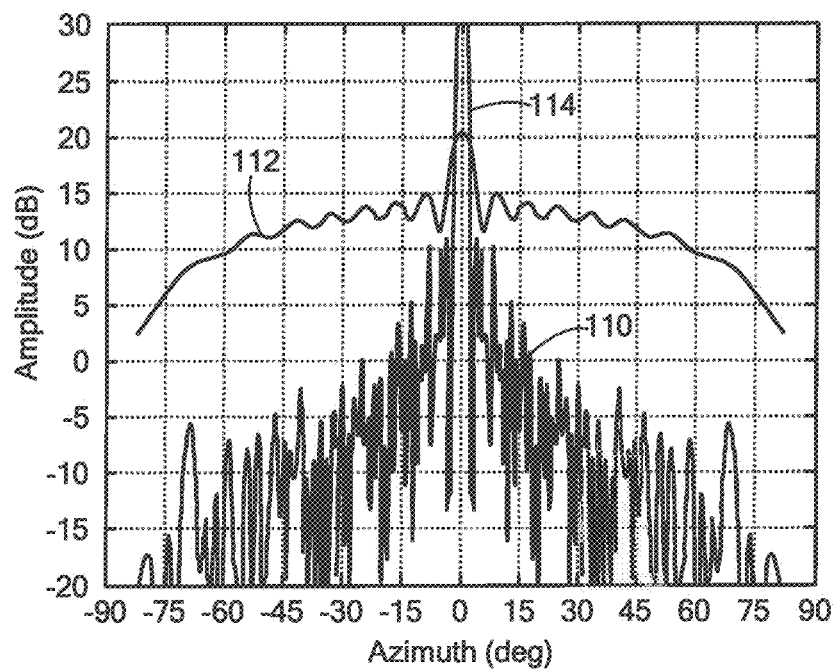
FIGS. 10 and 11 are amplitude versus angle plots illustrating antenna patterns for an antenna system having an L-guard array in accordance with an embodiment.
Figure 11:
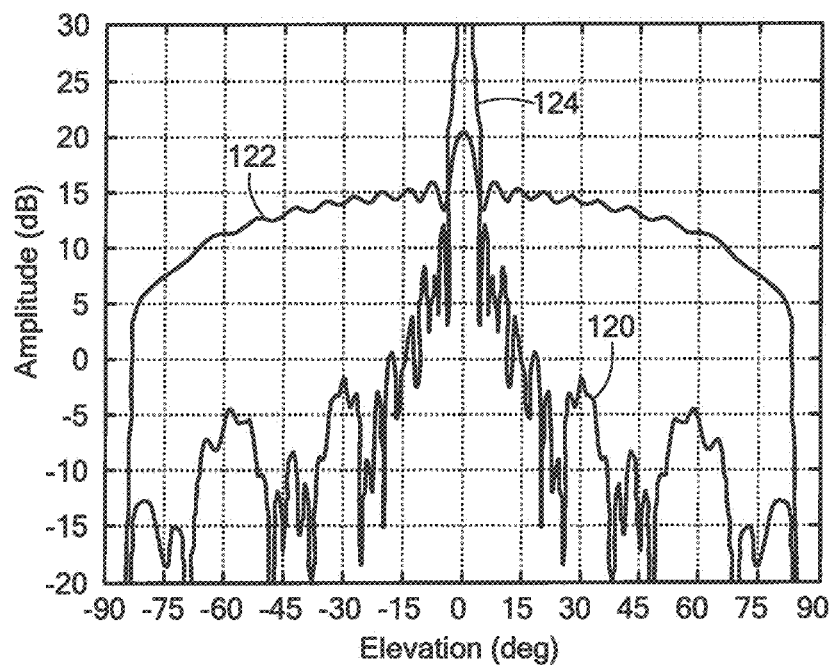

FIGS. 10 and 11 are amplitude versus angle plots illustrating antenna patterns for an antenna system having an L-guard array in accordance with an embodiment. FIG. 10 illustrates an antenna pattern 110 for as main array and an antenna pattern 112 for a corresponding L-guard array in an azimuth plane. Similarly, FIG. 11 illustrates an antenna pattern 120 for a main array and an antenna pattern 122 for a corresponding L-guard array in an elevation plane. As shown, in each direction, the gain of the pattern 112, 122 of the L-guard array is greater than the gain of the main array pattern 110, 120 in the side lobe regions. Also, the gain of the pattern 112, 122 of the L-guard array is smaller than the gain of the main array pattern 110, 120 in the direction of the main beam 114, 124 (e.g., azimuth angle=0 and elevation angle=0, respectively). As discussed previously, in some implementations, phase spoiling may be used in one or both array directions to reduce or eliminate nulls in the L-guard pattern.

Figure 12:
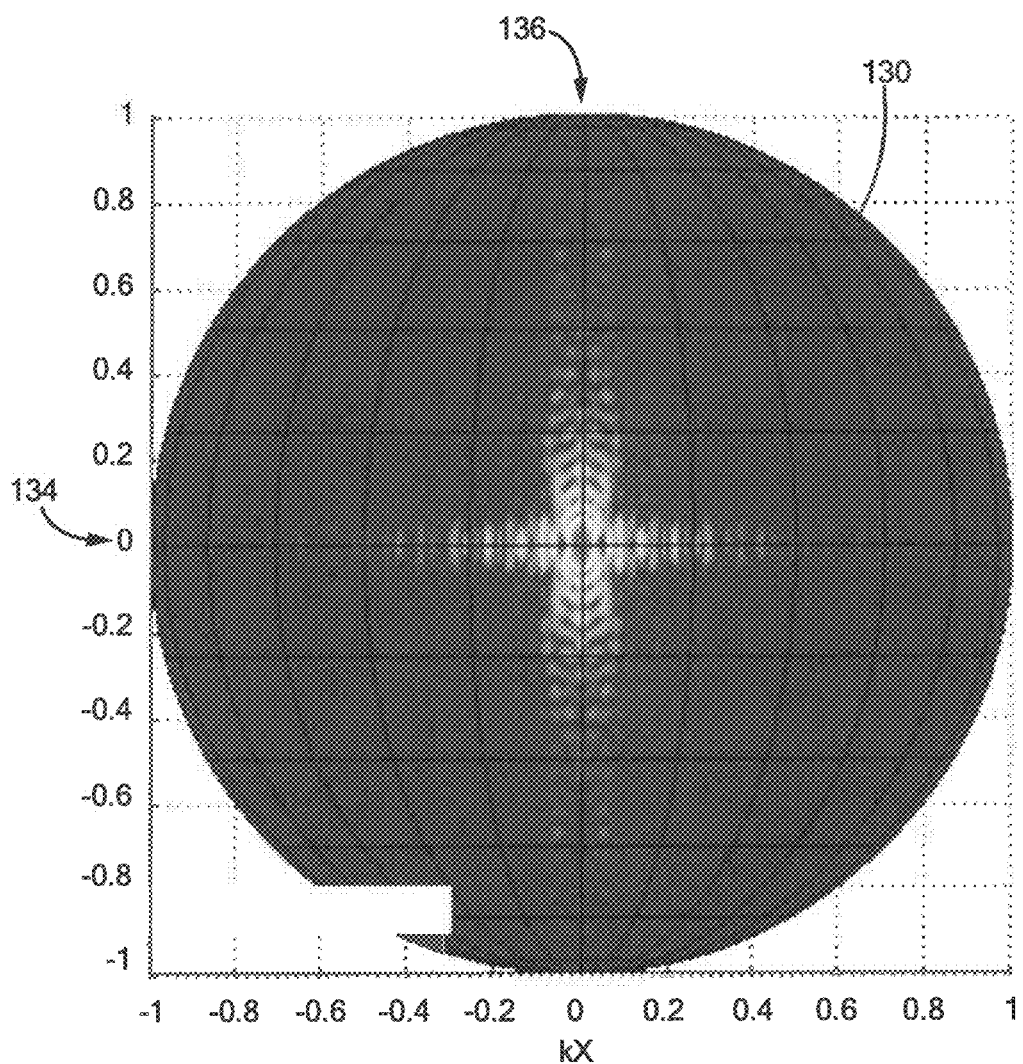
FIGS. 12, 13, and 14 are hemisphere plots illustrating antenna patterns for an antenna system having an L-guard array in accordance with an embodiment.
Figure 13:
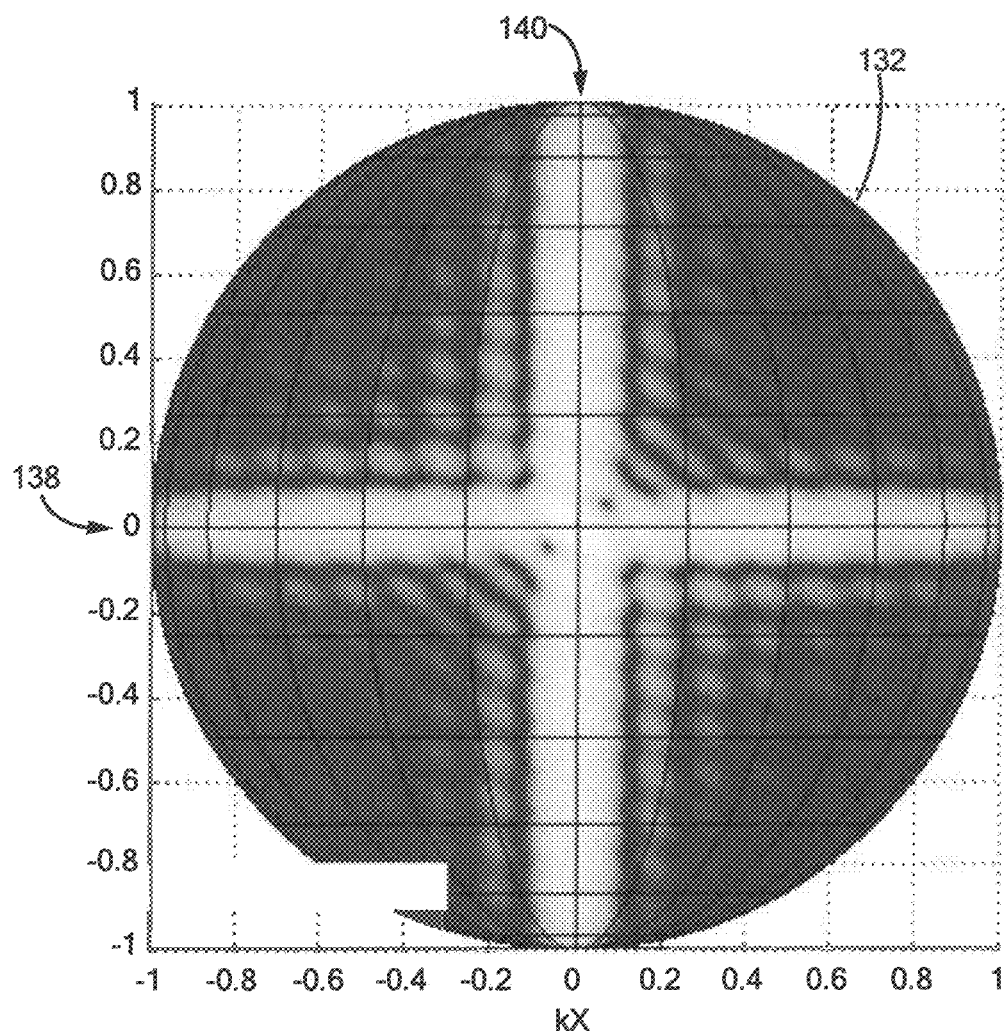
Figure 14:
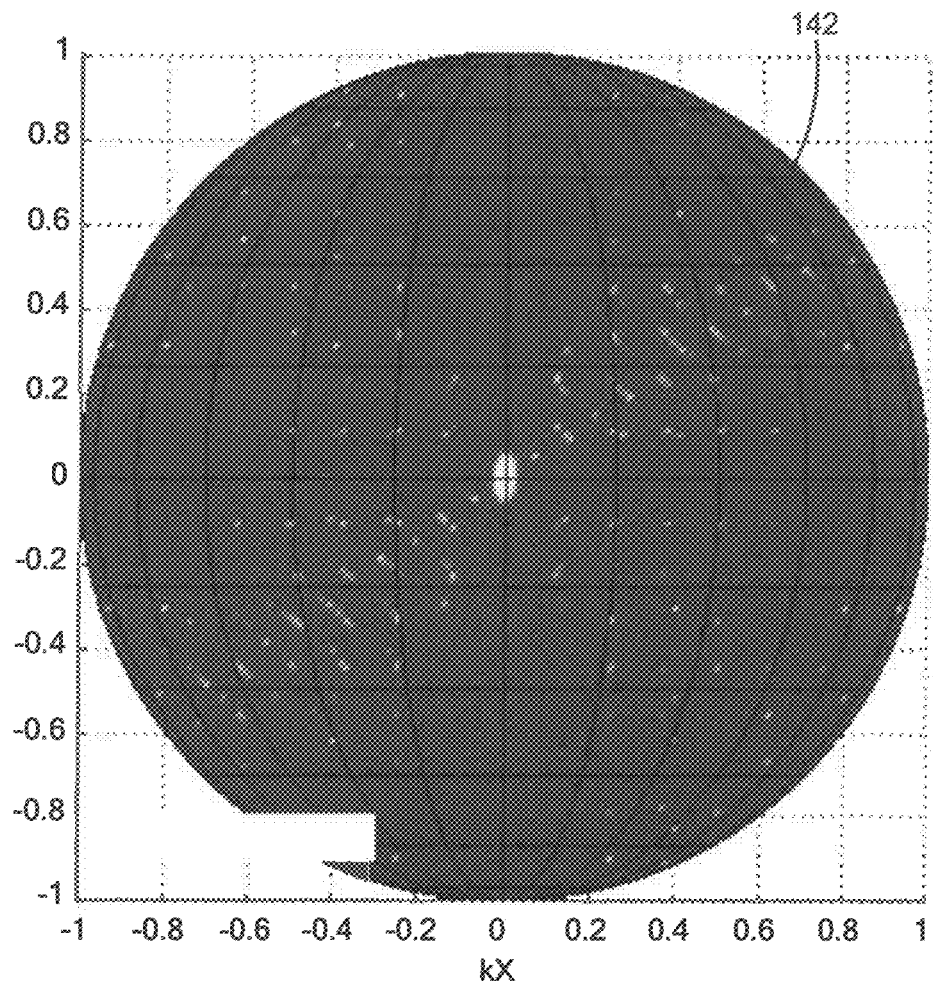

FIGS. 12, 13, and 14 are hemisphere plots illustrating antenna patterns For an antenna system having an L-guard array in accordance with an embodiment. The antenna patterns are illustrated using relative magnitudes at various locations in a coverage region. FIG. 12 illustrates an antenna pattern 130 for a main array of the antenna system that is rectangular or quasi-rectangular in shape. As shown, the antenna pattern 130 is substantially similar to pattern 90 of FIG. 6. That is, the pattern 130 includes a high magnitude portion at a center thereof, corresponding to a main beam of the main array. In addition, the side lobes of the main array are concentrated within two orthogonal ridges 134, 136. FIG. 13 illustrates an antenna pattern 132 for the L-guard array of the antenna system that is associated with the main array. As shown, the pattern 132 roughly follows the outline of the side lobe regions of the main array (see FIG. 12), while also covering the main beam position. That is, pattern 132 includes a strip 138 that encompasses and follows the shape of side lobe ridge 134 of pattern 130 and a strip 140 that encompasses and follows the shape of side lobe ridge 136 of pattern 130. In addition, the pattern 132 has a higher magnitude in the side lobe regions than the corresponding pattern of the main array, but has a significantly lower magnitude in the main beam position.

FIG. 14 illustrates an antenna pattern 142 of the full antenna system including both the main array and the L-guard array. As shown, only the main beam at the center of the pattern and some punch through points remain after the L-guard array processing has been performed. However, because of the reduced symmetry of the L-guard array, more punch through occurs for the L-guard array than with the cross-guard array described previously (particularly in the diagonal planes). Therefore, the simplified packaging features of the L-guard array are balanced by reduced punch through performance.

Figure 15:
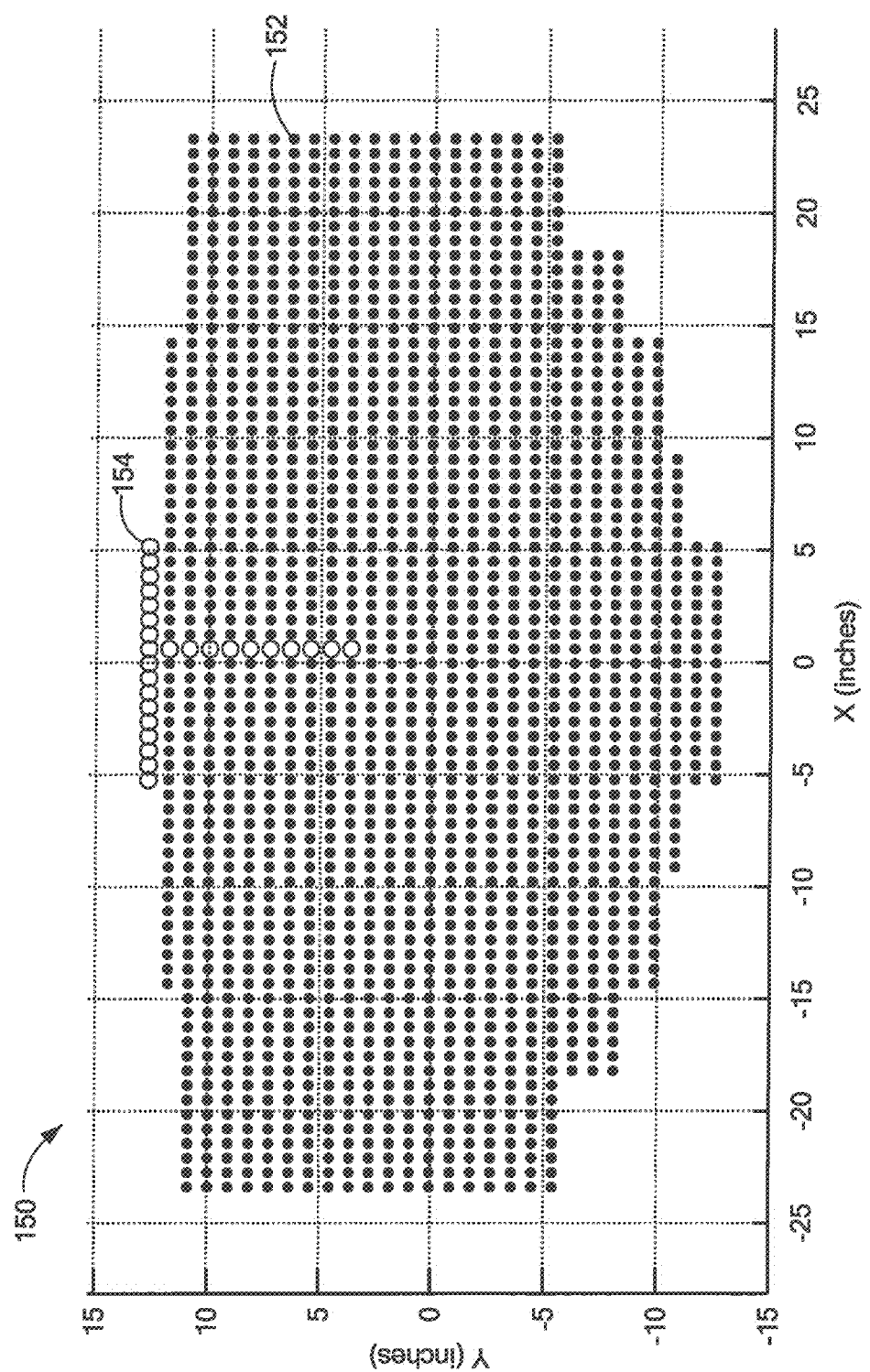
FIG. 15 is a schematic diagram illustrating an exemplary antenna system including a T-guard array in accordance with an embodiment.

FIG. 15 is a schematic diagram illustrating an exemplary antenna system 150 including a T-guard array in accordance with an embodiment. As illustrated, antenna system 150 may include a rectangular (or quasi-rectangular) main array 152 having an T-guard array 154 embedded therein. As shown, T-guard array 154 may comprise one or more adjacent rows of elements that adjoin to one or more adjacent columns of elements to form a T shape. That is, an end of either the column(s) or row(s) of T-guard array 154 may adjoin to an intermediary point on the corresponding rows(s) or column (s). In the illustrated embodiment, a single column of elements contacts a single row of elements at a mid-point thereon. In addition, the single row of elements and the single column of elements each have the same number of elements in the illustrated embodiments. In other implementations, the rows and columns of T-guard array 154 may have different numbers of elements and/or may intersect at non-central locations.

As with the configurations described previously, the antenna pattern formed by T-guard array 154 will roughly conform to and cover the distinct side lobe regions (i.e., the orthogonal ridges) of main array 152. In addition, because the T-guard array 154 has more symmetry than the L-guard array, but less than the cross-guard array, the punch through performance may be somewhere in between the other two configurations. Antenna patterns may also be similar to the other two configurations.

In the discussion above, various fixed antenna patterns were described in connection with different example antenna systems having guard arrays. In some embodiments, however, arrays having steerable beams may be used. In these embodiments, the pattern of the guard array may be steered in a similar manner to the main beam of the main array so that the benefits of the guard array may be achieved across an extended coverage region. For example, referring back to FIG. 2, controller 50 may be programmed to cause guard beamformer/receiver subsystem 46 to track the beam position of main beamformer/receiver subsystem 44 so that the functionality of the guard array 54 is achieved across the region of interest.

In the discussion above, the main array and the guard array were described as independent arrays that have overlapping apertures. In some embodiments, however, one or more elements of an antenna system may be shared between a main array and a guard array. To share an antenna element, an output of the element must be split in some fashion, with a portion of the split signal going to the beamformer/RF receiver associated with the main array and a portion going to the beamformer/RF receiver associated with the guard array. Any type of circuit or device may be used for splitting RF signals in this fashion including, for example, Wilkinson dividers, hybrid couplers, directional couplers, transformer-based splitters, lumped element based splitters, and/or others. In some embodiments, the ratio of the split may be selected to provide a desired amount of amplitude attenuation to support amplitude weighting for one or both of the arrays. Additional attenuation may also be provided in some cases for one or both of the antenna arrays to facilitate amplitude weighting of the elements. In at least one implementation, all of the elements of the guard array may be shared with the main array.

In the embodiments described above, the radiating elements of the various guard arrays are all located within the outer boundaries of the main array. In some embodiments, however, some of the elements of the guard array may reside outside the outer boundary of the main array. That is, the aperture of the guard array may overlap the aperture of the main array without being totally encompassed therein. In addition, in the embodiments described above, the elements of the guard array are located at points within the main array that are consistent with elements of the main array in element spacing and element alignment. In other embodiments, however, guard element locations may be different from those of the main array in element alignment and/or spacing.

In the embodiments described above, different guard array configurations were discussed in the context of a rectangular or quasi-rectangular main array. It should be appreciated that techniques, structures, and features described herein may also be implemented for use with main arrays having other shapes and configurations. In fact, themes described herein may be beneficially employed within any array having distinct, localized side lobe regions within which most or nearly all of the antenna side lobes are concentrated.

Figure 16:
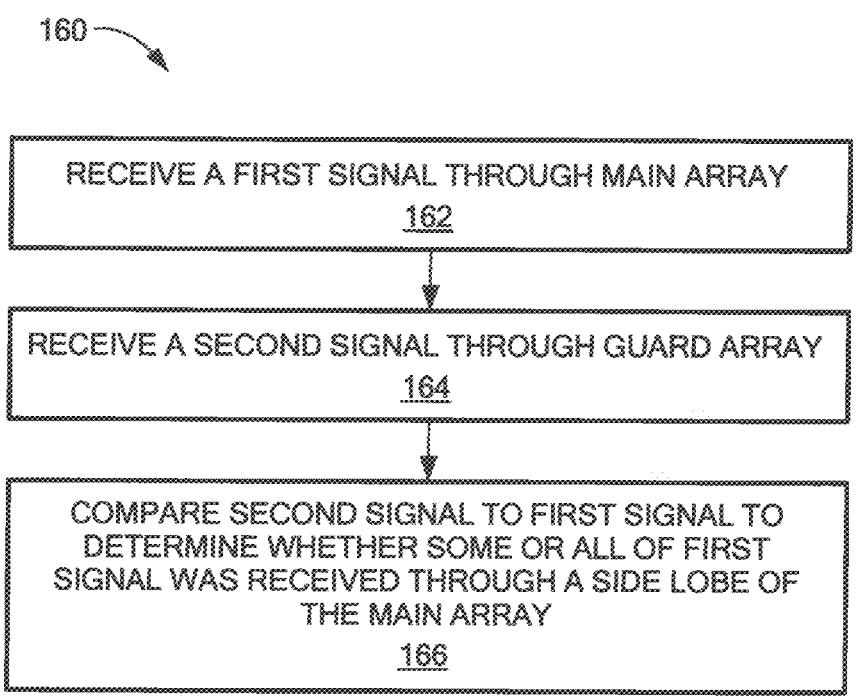
FIG. 16 is a flowchart illustrating a method for operating an antenna system having a main array and a guard array in accordance with an embodiment.

FIG. 16 is a flowchart illustrating a method 160 for operating an antenna system having a main array and a guard array in accordance with an embodiment. As described above, the main array may have an antenna pattern that includes a main beam and distinct side lobe regions within which most (or almost all) of the side lobes reside. The guard array may have an antenna pattern that covers the main beam of the main array and also the side lobes of the main array, where the pattern of the guard array roughly follows an outer boundary of the distinct side lobe regions of the antenna pattern of the main array. The gain of the antenna pattern of the main array may be larger than the gain of the antenna pattern of the guard array in the direction of the main beam. However, the gain of the antenna pattern of the main array may be smaller than the gain of the antenna pattern of the guard array in the direction of the side lobes of the main array.

During antenna system operation, a first signal may be received through the main array (block 162). At substantially the same time, a second signal may be received through the guard array (block 164). The second signal may then be compared to the first signal to determine whether some or all of the first signal was received through a side lobe of the main array (block 166). If a signal component received through the main array is larger in magnitude than a corresponding signal component received through the guard array, then it may be determined that the signal component received through the main array was received through the main beam. If a signal component received through the main array is smaller in magnitude than a corresponding signal component received through the guard array, then it may be determined that the signal component received through the main array was received through a side lobe. If received through a side lobe, the signal component may be rejected during signal processing.

As described previously, it is often difficult or impossible to achieve a gain in a guard array pattern that is higher than the gain of the main array pattern in the direction of the side lobes. If the gain of the guard array in the direction of the side lobes of the main array pattern is less than the gain of the main array, then additional signal processing will typically be required to determine whether the signal received through the main array was received through a side lobe. However, because the guard may structures and techniques described herein are capable of achieving a higher gain in the side lobe region of the main array, this additional processing (and the corresponding costs and complexity) may be avoided. It should be appreciated, however, that some implementations of the guard arrays described herein may have lower gain in the side lobe regions of the main array and may utilize additional signal processing.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An antenna system comprising:
a main array antenna including a first plurality of antenna elements defining a first aperture, the main array antenna having a first antenna pattern that includes a main beam and side lobes, the side lobes being primarily concentrated within one or more distinct side lobe regions, wherein the first antenna pattern has primary side lobes concentrated within two orthogonal side lobe regions of the first antenna pattern; and
a guard array antenna including a first linear array of antenna elements and a second linear array of antenna elements disposed orthogonally to the first linear array of antenna elements, the first and second linear arrays defining a second aperture, the guard array antenna having a second antenna pattern with a shape that encompasses the one or more distinct side lobe regions of the first antenna pattern and substantially follows a shape of the one or more distinct side lobe regions of the first antenna pattern, wherein the second antenna pattern has a shape that substantially follows the two orthogonal regions of the first antenna pattern.

2. The antenna system of claim 1, wherein:
the guard array antenna has higher antenna gain than the main array antenna in the directions of the one or more distinct side lobe regions of the first antenna pattern.

3. The antenna system of claim 1, wherein:
the main array antenna and the guard array antenna share at least one antenna element.

4. The antenna system of claim 1, further comprising:
beamformer coupled to the guard array antenna to form a beam for the guard array antenna, the beamformer being configured to perform phase spoiling in the direction of one or both of the two orthogonal regions of the first antenna pattern, to reduce or eliminate nulls in the second antenna pattern.

5. The antenna system of claim 1, wherein:
the guard array antenna is fixed with respect to the main array antenna and the first aperture and the second aperture overlap.

6. The antenna system of claim 1, wherein:
the first linear array comprises a first group of elements aligned in a first direction and the second linear array comprises a second group of elements aligned in a second direction that is substantially orthogonal to the first direction, wherein the first group of elements and the second group of elements include at least one common element.

7. The antenna system of claim 6, wherein:
the first plurality of antenna elements of the main array antenna are arranged in a rectangular or quasi rectangular shape; and
the first direction is substantially parallel to a first edge of the main array antenna and the second direction is substantially parallel to a second edge of the main array antenna.

8. The antenna system of claim 7, wherein:
the first linear array and the second linear array of the guard array antenna are arranged in an L shape.

9. The antenna system of claim 8, wherein:
the antenna elements of the guard array antenna are located in a corner of the main array antenna within the first aperture.

10. The antenna system of claim 7, wherein:
the first linear array and the second linear array of the guard array antenna are arranged in a T shape.

11. The antenna system of claim 10, wherein:
the first linear array aligned in the first direction is near the first edge of the main array antenna; and
the second linear array aligned in the second direction extends from the first linear array toward the center of the main array antenna.

12. An antenna system comprising:
a main array antenna including a first plurality of antenna elements defining a first aperture, the main array antenna having a first antenna pattern that includes a main beam and side lobes, the side lobes being primarily concentrated within one or more distinct side lobe regions, wherein the first antenna pattern has primary side lobes concentrated within two orthogonal side lobe regions of the first antenna pattern; and
a guard array antenna including a first linear array of antenna elements and a second linear array of antenna elements disposed orthogonally to the first linear array of antenna elements, the first and second linear arrays defining a second aperture, the guard array antenna having a second antenna pattern with a shape that encompasses the one or more distinct side lobe regions of the first antenna pattern and substantially follows a shape of the one or more distinct side lobe regions of the first antenna pattern, wherein the second antenna pattern has a shape that substantially follows the two orthogonal regions of the first antenna pattern; and
a beam steering controller configured to cause a steerable receive beam of the guard array antenna to track a steerable receive beam of the main array antenna in at least one operational mode.

13. The antenna system of claim 1, wherein:
the guard array antenna is located near a center of the main array antenna within the first aperture.

14. The antenna system of claim 1, wherein:
the guard array antenna is located near an edge of the main array antenna within the first aperture.

15. The antenna system of claim 1, wherein:
the main array antenna uses amplitude weighting where different antenna elements are weighted at different amplitudes; and
the guard array antenna is located within the first aperture near a portion of the main array antenna where elements are weighted at lower amplitudes.

16. A machine implemented method for operating an antenna system, the method comprising:
receiving a first signal through a main array antenna of the antenna system, the main array antenna having a first antenna pattern that includes a main beam and side lobes, wherein most of the side lobes reside in distinct side lobe regions, and wherein the first antenna pattern has primary side lobes concentrated within two side lobe orthogonal regions of the first antenna pattern;
receiving a second signal through a guard array antenna of the antenna system, the guard array antenna having a second antenna pattern that covers both the main beam and the distinct side lobe regions of the first antenna pattern, the second antenna pattern having a shape that substantially follows a shape of the two orthogonal side lobe regions of the first antenna pattern, wherein the guard array antenna comprises a first linear array of antenna elements and a second linear array of antenna elements disposed orthogonally to the first linear array of antenna elements; and
comparing the first and second signals to determine whether one or more signal components received through the main array antenna were received through a side lobe.

17. The method of claim 16, wherein:
comparing the first and second signals includes determining whether an amplitude associated with the second signal is larger than an amplitude associated with the first signal.

18. The method of claim 16, wherein:
the main array antenna has a plurality of antenna elements arranged in a rectangular or quasi rectangular shape; and
the guard array antenna has a plurality of antenna elements arranged in a cross shape.

19. The method of claim 16, wherein:
the main array antenna has a plurality of antenna elements arranged in a rectangular or quasi rectangular shape; and
the guard array antenna has a plurality of antenna elements arranged in an L shape.

20. The method of claim 16, wherein:
the main array antenna has a plurality of antenna elements arranged in a rectangular or quasi rectangular shape; and
the guard array antenna has a plurality of antenna elements arranged in a T shape.

21. An antenna system comprising:
a main array antenna having radiating elements arranged in a rectangular or quasi rectangular shape; and
a guard array antenna having a first linear group of radiating elements aligned in first direction and a second linear group of radiating elements aligned in a second direction that is substantially orthogonal to the first direction, the first and second groups of radiating elements having at least one common element, wherein the guard array antenna has an antenna pattern with a shape that encompasses and substantially follows a shape of one or more distinct side lobe regions of an antenna pattern of the main array antenna.

22. The antenna system of claim 21, wherein:
the main array antenna and the guard array antenna have overlapping apertures.

23. The antenna system of claim 21, wherein:
the first group of radiating elements includes a single row of radiating elements and the second group of radiating elements comprises a single column of radiating elements.

24. The antenna system of claim 21, wherein:
the first and second groups of radiating elements are arranged in an L shape.

25. The antenna system of claim 21, wherein:
the first and second groups of radiating elements are arranged in a T shape.

26. The antenna system of claim 21, wherein:
the first direction corresponds to a long dimension of the main array and the second direction corresponds to a short dimension of the main array.

* * * * *